United States Patent
Blewett et al.

(10) Patent No.: US 7,869,786 B1
(45) Date of Patent: *Jan. 11, 2011

(54) SYSTEM AND METHOD FOR PROVIDING WIRELESS SERVICES WITHIN A WIRELESS LOCAL AREA NETWORK

(75) Inventors: Charles Douglas Blewett, Madison, NJ (US); Ramon Caceres, New York, NY (US); James Christopher Ramming, Palo Alto, CA (US)

(73) Assignee: AT&T Intellectual Property II, L.P., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/584,214

(22) Filed: Sep. 1, 2009

Related U.S. Application Data

(63) Continuation of application No. 11/542,333, filed on Oct. 2, 2006, now Pat. No. 7,603,101, which is a continuation of application No. 09/580,685, filed on May 30, 2000, now Pat. No. 7,130,612.

(51) Int. Cl.
*H04M 11/00* (2006.01)

(52) U.S. Cl. .................. 455/405; 455/406; 455/407; 379/144.01; 370/338

(58) Field of Classification Search ............. 455/405, 455/407, 406; 379/144.01; 370/338
See application file for complete search history.

(56) References Cited

U.S. PATENT DOCUMENTS

| | | | |
|---|---|---|---|
| 6,286,039 B1 * | 9/2001 | Van Horne et al. | 709/221 |
| 6,324,394 B1 * | 11/2001 | Vazvan | 455/406 |
| 6,424,706 B1 * | 7/2002 | Katz et al. | 379/144.01 |
| 6,584,500 B1 * | 6/2003 | Arkko | 709/223 |
| 2001/0012282 A1 * | 8/2001 | Yegoshin | 370/338 |

* cited by examiner

*Primary Examiner*—Danh C Le

(57) ABSTRACT

The invention provides a system and method for providing a temporary wireless service connection to one or more users within a wireless local area network. In-building services and Internet related services are provided to the users over their respective temporary wireless service connections. Each user is charged for their specific usage amounts which may be based on the number of packets transferred, the number of bytes transferred, the number of distinct transactions and/or the time period each user's temporary wireless service connection was active.

20 Claims, 4 Drawing Sheets

SYSTEM AND METHOD FOR PROVIDING WIRELESS SERVICES WITHIN A WIRELESS LOCAL AREA NETWORK

CROSS REFERENCE TO RELATED APPLICATIONS

This application is a continuation of co-pending application Ser. No. 11/542,333, entitled "System And Method For Providing Wireless Services Within A Wireless Local Area Network," filed Oct. 2, 2006 now U.S. Pat. No. 7,603,101, which is a continuation of application Ser. No. 09/580,685, entitled "System And Method For Providing Wireless Services Within A Wireless Local Area Network," filed May 30, 2000 now U.S. Pat. No. 7,130,612.

BACKGROUND OF THE INVENTION

The present invention relates to wireless communication systems and, more particularly, to a system and method for providing temporary wireless services on a pay per use basis over a wireless local area network.

In an increasingly mobile society, telecommunications service providers are offering many different types of telecommunication services to their customers. With the increasing popularity of wireless communication systems such as wireless telephone systems, wireless personal communication systems, and related paging systems, such services allow users of wireless communication devices (e.g. mobile telephones, mobile data devices, personal digital assistants (PDA) or paging receivers) to manage their availability for communication. Such services are generally provided to users on a subscription basis, and therefore these users are often referred to as subscribers.

Such wireless service subscriptions typically require a user to commit to a predetermined length of service such as a year or more. Early termination usually involves a penalty levied by the service provider to the user. In addition, many wireless service providers are geographically limited in that if a subscriber uses their particular wireless device outside the local service area, additional fees such as roaming and connection charges may apply to the use of that user's wireless device. Even within a user's local service area, many wireless service providers do not provide adequate coverage especially within enclosed structures such as within office buildings and other similar structures. Accordingly, these and other shortcomings make conventional wireless services less than desirable in many instances.

Accordingly, it would be desirable to have a system and method for providing temporary wireless services to a user on a pay per use basis without the limitations of conventional wireless services as discussed above.

SUMMARY OF THE INVENTION

The present invention provides a system and method for providing temporary wireless services on a pay per use basis to one or more users within a wireless local area network. The method of the present invention includes the steps of providing a temporary wireless service connection to a user, determining a usage amount incurred by the user for the temporary wireless service connection and charging the user for the determined usage amount for the temporary wireless service connection. The step of providing a temporary wireless service connection to the user includes dynamically assigning an IP address to the user for purposes of identifying the user to the wireless local area network. Additionally, the step of providing a temporary wireless service connection to the user includes receiving payment information from the user which may be a credit card, debit account or other account information to which a charge for the temporary service connection may be received. The charge to the user for the temporary wireless service connection may be determined per packet, per time, per byte and/or per transaction as incurred by the user.

A system of the present invention includes a wireless device such as a palmtop or Personal Digital Assistant (PDA) which is in communication with one or more network routers through one or more access points or stations within the wireless local area network. Upon the user's entry into the wireless local area network, the user's device may be assigned an IP address by the network muter. The network router is also responsible for determining how much to charge each user in the wireless local area network for the each user's temporary wireless service connection. The network muter may charge each user based on a number of factors such as the number of bytes used, the number of packets transferred to and from the user, the amount of time the user's wireless service connection was active and/or the number of distinct transactions the user transacted through the wireless service connection. Some services may be provided with no charge to the user via the temporary wireless service connection. For example, the user may be able to access in-network or in-building services with no charge.

DETAILED DESCRIPTION OF THE INVENTION

Figure 1:
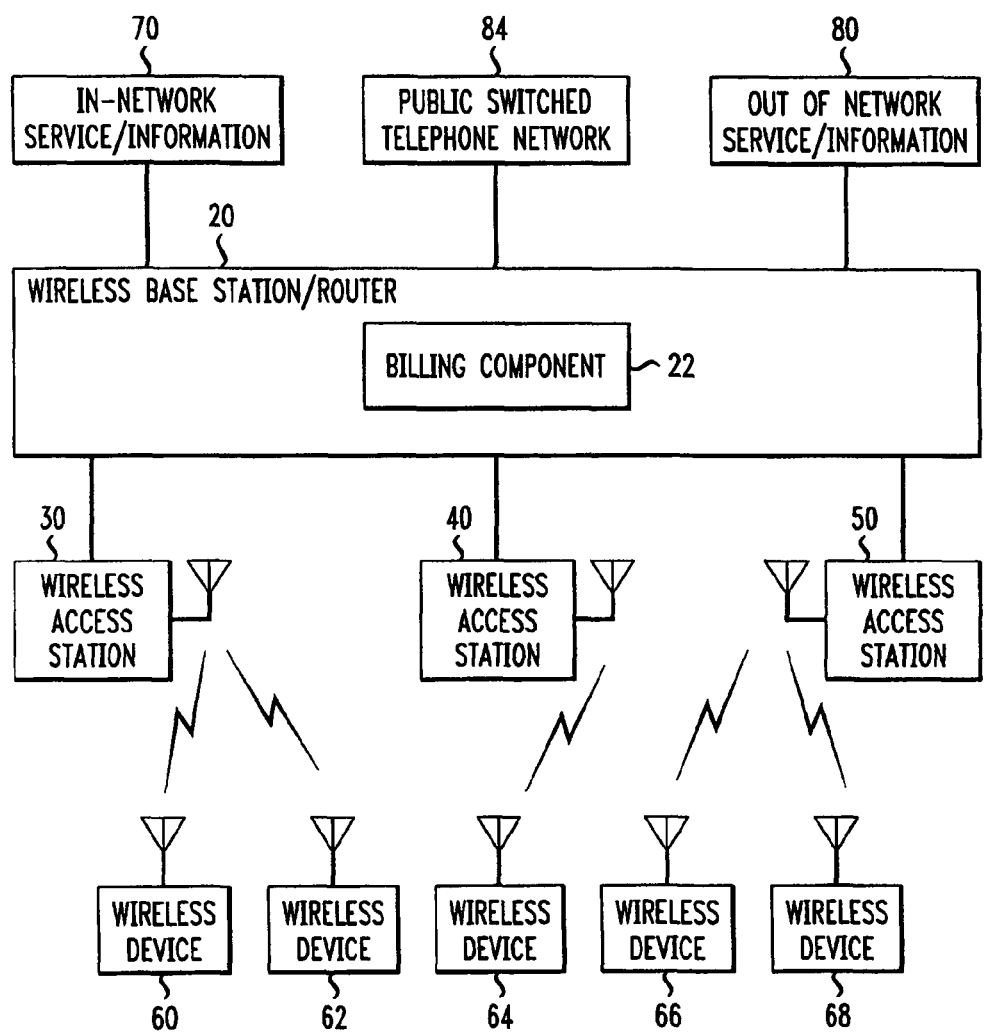
FIG. 1 illustrates an exemplary system in accordance with the teachings of the present invention.

Referring to FIG. 1, a wireless local area network communication system 10 is illustrated for providing temporary wireless services to one or more users on a pay per use basis. In the present invention, users may be charged for the temporary wireless services on a per time basis, a per packet basis, a per byte basis and/or on a per transaction basis. In accordance therewith, a user will not be required to commit to a lengthy wireless service contract but may simply purchase wireless services as needed on an "as-used" basis.

Referring again to FIG. 1, the local area wireless communication system 10 includes at least one wireless base station/router 20 having an integrated billing component 22 which is responsible for administering billing for the temporary wireless services provided by the system 10, as discussed in more detail later herein. In this embodiment of the present invention, the wireless base station/router 20 is in communication with one or more wireless access stations 30, 40, and 50. The wireless access stations 30, 40 and 50 are in further communication with one or more wireless devices such as wireless devices 60, 62, 64, 66, 68. The wireless devices may be any wireless device, such as a Personal Digital Assistant (PDA), which is capable of receiving and/or transmitting wireless communications.

In the present invention, wireless device users will have access preferably to both "in-network" services (such as in-building services and information) 70 and/or "out of network" related services and information (such as Internet services and information) 80 provided through the wireless base station/router 20. In the present invention, in-building services and information may encompass locator services, emergency information, personnel directories and other similar services/information. Internet services and information may encompass any Internet related services/information such as electronic mail, Internet Protocol (IP) telephony, web sites and pages, and other similar services/information.

Additionally, the wireless base station/router 20 may provide users with access to the public switched telephone network (PSTN) 84 so that the wireless users may communicate with traditional land line stations and networks. In one embodiment, the PSTN connection is provided via a gateway such as one based on the H.323 standard of the International Telecommunications Union (ITU) and/or a signal interface processor (SIP) gateway. Via the PSTN connection, the wireless users in the present system may make "traditional"-type toll phone calls such as may be made via a conventional wired public telephone.

Figure 2:
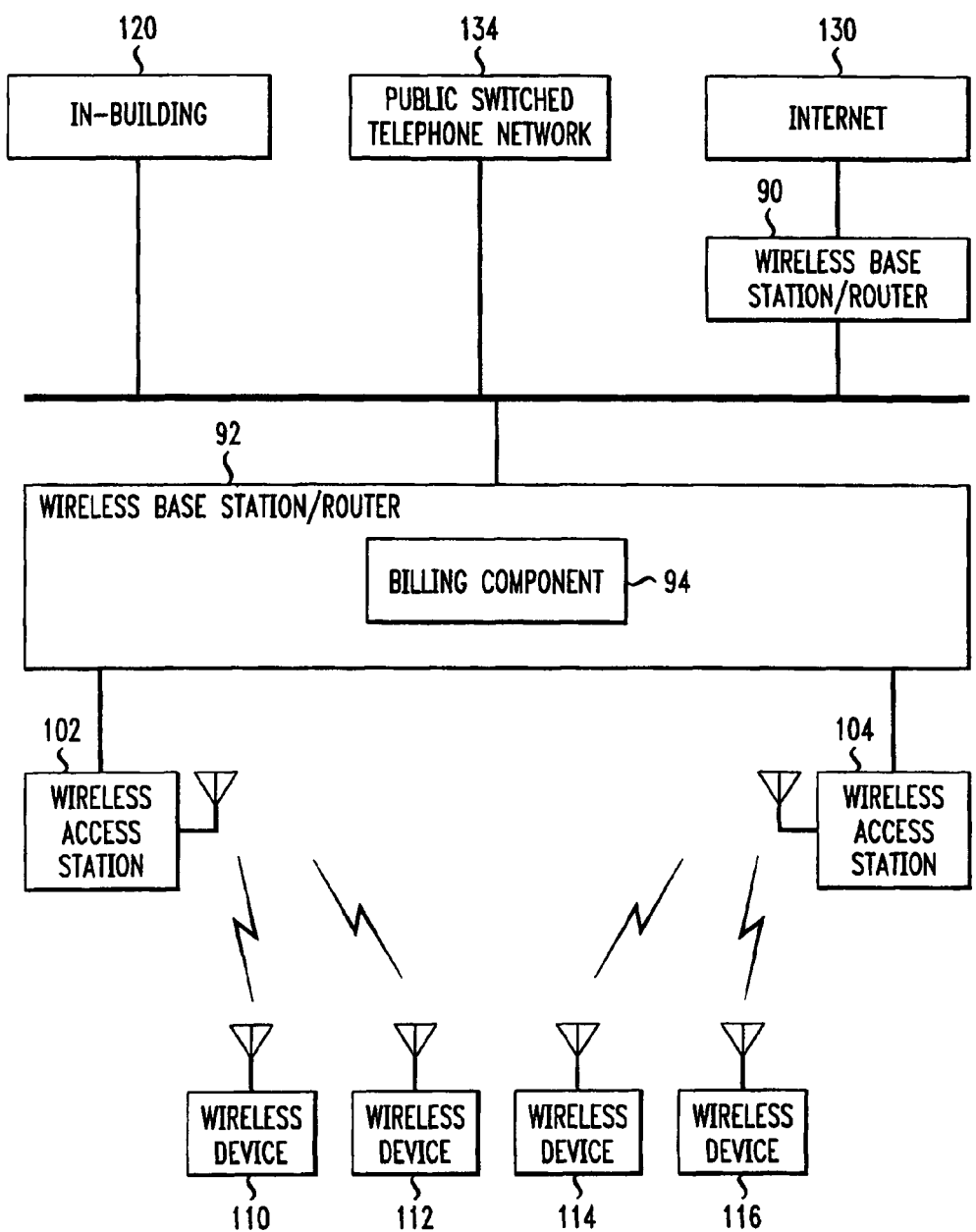
FIG. 2 illustrates another exemplary system in accordance with the teachings of the present invention.

In another embodiment of the present invention as shown in FIG. 2, two or more wireless base stations/routers 90 and 92 are provided. At least one of the base stations/routers such as base station/router 92 includes a billing component 94 for administering billing for the temporary wireless services provided by the system. The wireless base station/router 92 is in to communication with wireless access stations 102 and 104. Wireless access stations 102 and 104 are in further communication with wireless devices 110, 112, 114 and 116 which provide the wireless device users with access to in-building services/information 120, interne related services/information 130 and the public switched telephone network 134. In the present invention, an exemplary technology for providing wireless communications over a local wireless network is the IEEE 802.11 standard.

Figure 3:
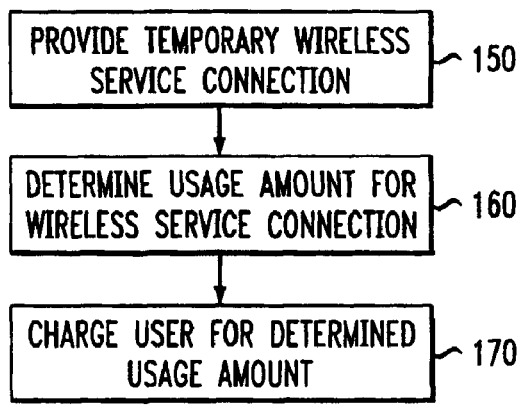
FIG. 3 illustrates an exemplary method in accordance with the teachings of the present invention.

Referring to FIG. 3, a first embodiment of the present inventive method is shown. The method generally includes the steps of providing a temporary wireless service connection to a user, step 150, determining a usage amount incurred by the user for the temporary wireless service connection, step 160 and charging the user for the determined usage amount for the temporary wireless service connection, step 170. These steps and variations thereof will now be discussed in more detail.

Figure 4:
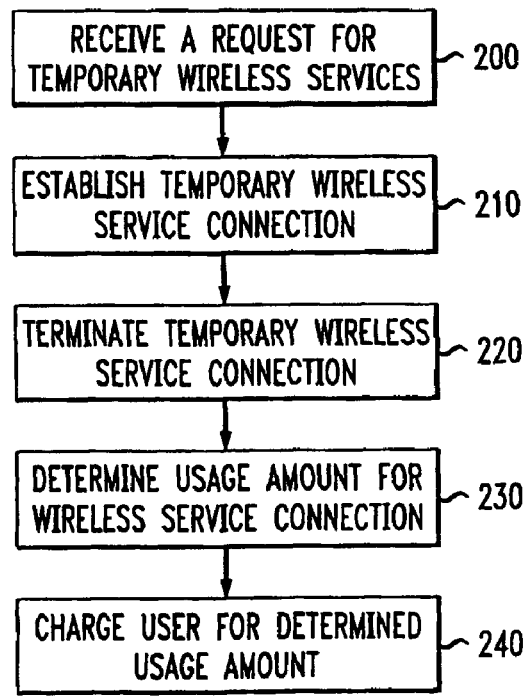
FIG. 4 illustrates another exemplary method in accordance with the teachings of the present invention.

Referring to FIG. 4, another embodiment of the present inventive method is shown. In this embodiment, a request for temporary wireless services is received from a user, step 200. In one embodiment, the request may be as simple as the user entering the wireless local area network and "powering on" their wireless device. Once the user's request is received, a temporary wireless service connection is established for the user, step 210. Typically, establishing a temporary wireless service connection for the user also includes dynamically assigning an IP address to the user who has entered the wireless local area network.

In the present invention, dynamic addressing of IP addresses for the wireless devices may be performed via a dynamic host configuration mechanism or "Dynamic Host Configuration Protocol (DHCP)-like" mechanism for dynamically assigning IP addresses. Dynamic allocation is particularly useful for assigning an address to a client or user that will be connected to the wireless local area network only temporarily or for sharing a limited pool of IP addresses among a group of clients or users that do not need permanent IP addresses. In the present invention, once the user is assigned their respective IP address, the user will be free to access any in-building services/information, Internet related services/information and the PSTN through their wireless device, such as a PDA within the wireless local area network. In one embodiment, the dynamic host configuration mechanism apportions IP addresses out for a limited time interval. After the time interval expires the resource must be requested again by the wireless device.

Referring again to FIG. 4, once the user is finished using the temporary wireless service connection, the temporary wireless service connection is terminated, step 220. The user's temporary wireless service connection may be terminated pro-actively by the user, for example, by "powering-off" their wireless device or by issuing a signal to the system to terminate service. Service may also be terminated by the system, for example, after a pre-determined amount of time or other reason. The usage amount for the temporary wireless service connection is determined, step 230, on either a per time used basis, per packet transferred basis, per byte transferred basis and a per transaction basis or a combination thereof as required by the system. Preferably, the usage amount is tallied on an on-going basis, for example, by the billing component of the wireless base station/router, as services are used by each user the wireless local area network. A charge is then levied for the determined usage amount, step 240.

Typically, the user's usage amount for the temporary wireless service connection will be tracked from the moment the user is assigned an IP address to the moment the temporary wireless service connection for the user is disconnected or terminated. As discussed earlier, this may be done, for example, by simply calculating how many minutes the user was provided the temporary wireless connection or by way of further example, by how many bytes and/or packets were transferred to and from the user's wireless device. The calculation may also be transaction based, for example, by calculating how many HTTP requests a user requested and how many HTTP responses the user received. Various billing schemes are easily implemented for each of these calculations, for example, such as by charging a certain predetermined dollar amount for each minute, packet, byte and/or transaction used.

Figure 5:
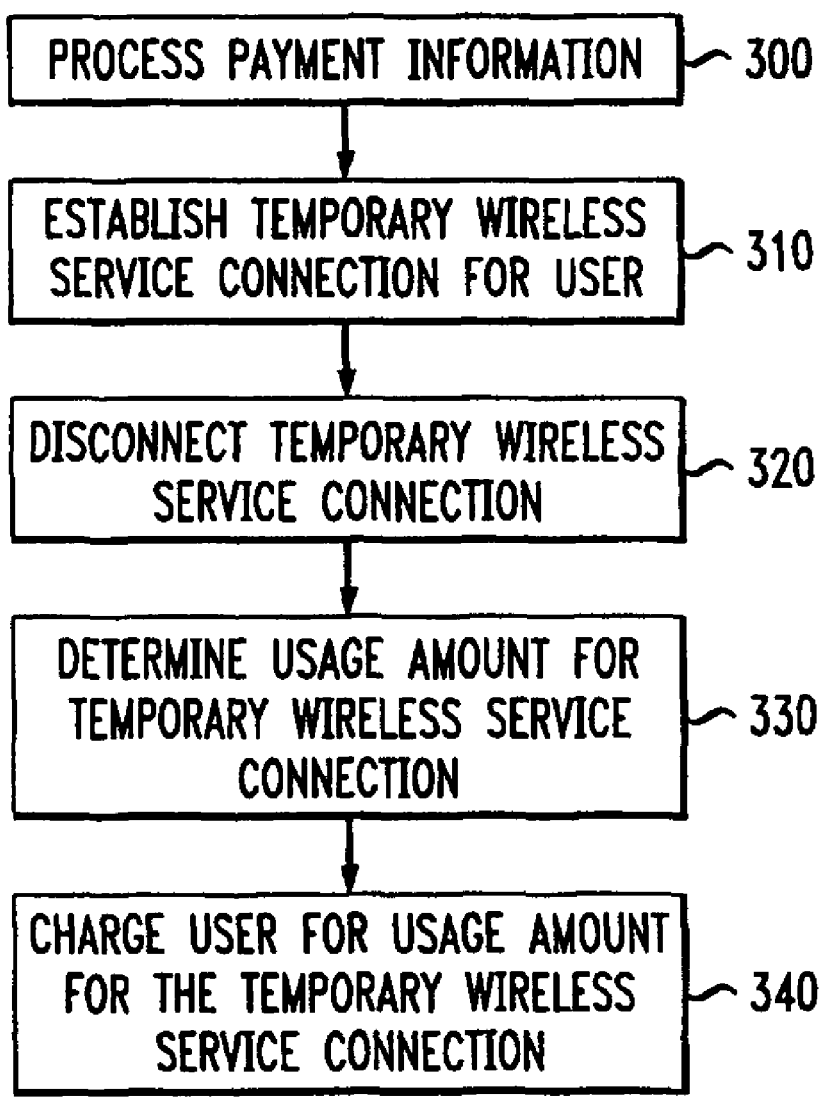
FIG. 5 illustrates yet another exemplary method in accordance with the teachings of the present invention.

Referring to FIG. 5, another embodiment of the present inventive method is shown. In this embodiment, the system first processes the user's payment information, step 300. Processing the user's payment information may include receiving a payment identifier from the user, such as a credit card and then verifying the payment identifier, such as through a third party credit card verification service. Such a credit card verification system may also be implemented within the wireless local area network as needed. Once the user's payment information is processed, a temporary wireless service connection is established for the user, step 310. Once the user is finished with the temporary wireless connection, the temporary wireless service connection is disconnected, step 320. The system determines, such as through the billing component, the specific user's usage amount for the temporary wireless service connection, step 330. As discussed earlier herein, the usage amount may be determined per time used, per packet transferred, per byte transferred and/or per transaction transacted. The user is then charged for the usage amount for the temporary wireless service connection, step 340.

A number of possible scenarios implementing the teachings of the present system and method are now discussed. In one embodiment of the present invention, a centralized wireless service station or "kiosk" is provided where users may activate their temporary wireless service connection, pay for their temporary wireless service connection, secure a wireless device if the user does not already have one and conduct other administrative functions. This service station may encompass the wireless base station/router as discussed earlier herein or the service station may be a separate facility which is in communication with the wireless base station/router. This central service station or kiosk may be provided in a centralized location within a building, such as in the lobby of the building or in the case of an outdoor area, such as a park, the service station may be located at the main gate or other centralized location.

Typically a user provides a payment identifier to a centralized service station to activate the temporary wireless Internet service. The payment identifier may be any account to which a charge may be levied, such as a bank account, a credit card account, a telephone number, a debit account and other similar accounts. In other embodiments, the service station may have a facility for accepting cash such as coins or bills. For example, the service station may have an assembly for accepting bills in different denomination such that a user may, for example, provide a twenty dollar bill and use the temporary wireless services against the cash provided. Typically, it will be more convenient for the user to provide a payment identifier such as a credit card account, such as by swiping their card through a magnetic card reader provided in the service station or simply by entering their credit card account number manually through a keyboard or keypad entry. In other embodiments, the service station may be able to accept wireless transmission of the user's payment information such as by receiving through some wireless transmission such as by cellular, radio or infra-red transmission waves through a wireless device such as through a user's palmtop device which may "beam" or transmit the user's payment information directly to the service station.

Once the service station receives the user's payment information, typically, the user's payment information, such as their payment identifier will be validated. For example, if a credit card account is provided by the user, the service station will initiate a communication with a credit card verifying authority as is known in the art to verify that the user's credit card account information is valid. The verifying authority may also be contained within the wireless base station/router such that the user's credit card information may be verified within the wireless base station/router. In another embodiment, where the user provides cash to the service station, typically some verification process is undertaken to determine that the cash provided by the user is authentic such as can be accomplished through a conventional cash bill reader.

Once a user's payment information is validated, a temporary Internet service connection is established with the user's wireless device, typically by first assigning the user or more specifically, the user's device an IP address. In one embodiment, the user provides their own wireless device, such as a wireless telephone, a computer such as a laptop computer, a palmtop or PDA, a facsimile or other wireless device. Typically, the user's device will not have a wireless service activated or alternatively, the user's device will have a wireless service activated but the user may prefer to use the temporary wireless service connection of the present invention for a number of reasons. For example, if the user has a wireless telephone but the user is out of their typical service area such that using the telephone would result in a excessive charge for using the phone, such as a roaming charge or other out of area surcharge, the user may prefer to establish a temporary wireless service connection. In another embodiment, a wireless device such as a wireless telephone, a computer such as a laptop computer, a palmtop or PDA, a facsimile or other wireless device are provided to the user for their own use. In one embodiment, the wireless device may be tethered by a security cable to prevent theft or unwanted removal of the device. Typically, the wireless device will not be attached to the service station such that the user will have some mobility when using the provided wireless device.

Once the user has completed use of the temporary wireless service connection, the user may perform a number of tasks which will terminate the temporary wireless service connection. The user may simply power off their wireless device which will disconnect the temporary wireless service connection. The user may also terminate the specific software or application which is using the temporary wireless service connection, such as their browser or electronic mail software. The system may also have a provision for terminating the temporary wireless service connection through the wireless service station, such as a button which provides a signal to the service station that the user wishes to terminate the temporary wireless service connection. Other methods may be used to terminate the temporary wireless service connection. The temporary wireless service connection may also be terminated automatically by the system, for example, after a predetermined number of usage time or in the case if the user has provided cash payment for the services, when the allotted number of usage time purchased by the user has been used up. Of course in such a case, the user may be provided with the opportunity to purchase additional usage time, such as providing more cash through the wireless service station and/or providing some sort of credit account, such as a credit card, to which a charge may be levied.

Once the temporary wireless service connection has been terminated to the user, the user's service usage amount will be determined, such as by the billing component discussed earlier herein. In the case of a per time used basis, the usage amount will be calculated by subtracting the ending time, i.e. the time of day the user terminated the temporary wireless service connection, by the starting time, i.e. the time the user established the wireless service connection or the user's IP address was assigned. Payment for the usage time may be accomplished in a number of manners. The user may be charged for each whole minute the user used, for example, if the user used up nine minutes of the temporary wireless service connection and the charge per minute is fifty cents, the user would be charged $4.50. Other charging schemes may be employed such as flat rate charge for up to a predetermined amount of usage time, such as $10 for usage time up to 20 minutes or other variations of this scheme. Additional charges may be levied to the user such as additional connection charges or other surcharges as required by each local system. In a per packet or per byte billing scheme, the user would simply be charged for the total amount of packets or bytes which were transferred to and from the user's wireless device. Again, the billing component as discussed earlier herein would monitor the amount of packets or bytes transferred to and from the user's wireless device. Such monitoring would preferably keep track of the packets or bytes by each user's IP address and store such information in a database facility provided in the billing component. Preferably the billing component would also have a processor, memory, BUS and other components for facilitating the billing process. In one embodiment, the billing component may be implemented as hardware or as software on a computer.

The temporary wireless services of the present invention may be used for a number of applications such as transfer of data, voice communications such as through Internet Protocol (IP) telephony, facsimile transmissions and other such related applications. Users within the wireless local access network may wish to complete a simple telephone call, check their electronic mail, browse one or more Web pages, transfer files, send a facsimile or other similar tasks that may be accomplished via wireless connection. In one embodiment of the present invention, the wireless local area network may be provided with a number of wireless telephone devices in a building through which one or more users may conduct telephone calls and pay only for those telephone calls as used. Thus, the users will have the convenience and mobility provided by the wireless telephones without having to sign up for extended wireless service or experience degraded wireless reception as may be experience through their conventional wireless telephone service. In this embodiment, the users will be free to roam within the confines of the wireless local area network, such as within the building providing the wireless local area network.

It will be apparent to those skilled in the art that many changes and substitutions can be made to the system and method described herein without departing from the spirit and scope of the invention as defined by the appended claims.

We claim:

1. A method for providing temporary wireless services on a pay per use basis over a wireless local area network, comprising:
    receiving a request for a temporary wireless service connection, the request comprising an entry of a non-subscribing user device into the wireless local area network, the non-subscribing user device being associated with no preexisting subscription for use of the wireless local area network;
    upon receiving said request, providing a temporary wireless service connection to the non-subscribing user device;
    determining a usage amount incurred by the non-subscribing user device for the temporary wireless service connection; and
    charging the user for the determined usage amount for the temporary wireless service connection.

2. The method of claim 1, wherein the request for temporary wireless services further comprises "powering on" the non-subscribing user device.

3. The method of claim 1, further comprising:
    receiving payment information from the non-subscribing user device.

4. The method of claim 1, wherein providing a temporary wireless service connection to the user includes dynamically assigning an IP address to the non-subscribing user device.

5. The method of claim 1, wherein the wireless service connection is provided using an 802.11 standard wireless protocol connection.

6. The method of claim 1, further comprising:
    receiving a wireless service termination signal from the non-subscribing user device.

7. The method of claim 1, wherein providing a temporary wireless service includes using a dynamic host configuration mechanism to apportion an IP address to the non-subscribing user device for a limited time interval.

8. The method of claim 1, wherein the usage amount is determined by how many minutes the user was provided the temporary wireless service connection.

9. The method of claim 1, wherein the usage amount is determined per byte transferred by the user.

10. The method of claim 1, wherein the usage amount is determined per transaction incurred by the user.

11. The method of claim 1, wherein the usage amount is determined per packet transferred by the user.

12. A system for providing a temporary wireless service connection to a non-subscribing user wireless device, comprising:
    a non-subscribing user wireless device; and
    a local wireless network for receiving a request for a temporary wireless service connection, the request comprising an entry of the non-subscribing user device into the wireless local area network, the non-subscribing user device being associated with no preexisting subscription for use of the wireless local area network; upon receiving said request, providing a temporary wireless service connection to the non-subscribing user device; determining a usage amount incurred by the non-subscribing user device for the temporary wireless service connection; and charging the user for the determined usage amount for the temporary wireless service connection.

13. The system of claim 12, wherein:
    the local wireless network including a dynamic host configuration mechanism for apportioning an IP address to the non-subscribing user wireless device for a limited time interval requested by a user, and causing the IP address to expire when the time interval expires, the determined usage amount being based at least in part on the time interval.

14. The system of claim 12, wherein the non-subscribing user wireless device is a personal digital assistant (PDA).

15. The system of claim 12, wherein the usage amount is determined per packet transferred.

16. The system of claim 12, wherein the usage amount is determined per time used.

17. The system of claim 12, wherein the usage amount is determined per transaction transacted.

18. The system of claim 12, wherein the usage amount is determined per byte transferred.

19. The system of claim 12, wherein the local wireless network includes a facility for assigning a dynamic IP address to the non-subscribing user wireless device.

20. The system of claim 12, wherein the request for temporary wireless services further comprises "powering on" the non-subscribing user device.

* * * * *